May 26, 1936.   J. F. CALVERT   2,042,208
DYNAMO-ELECTRIC MACHINE
Filed April 12, 1934   2 Sheets-Sheet 1
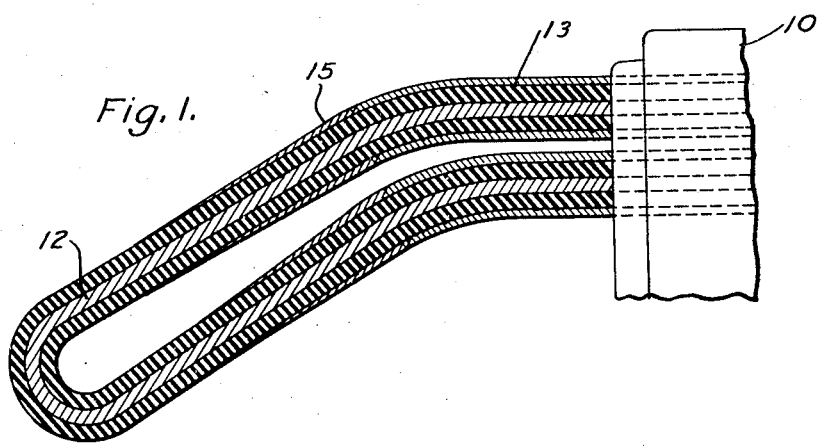
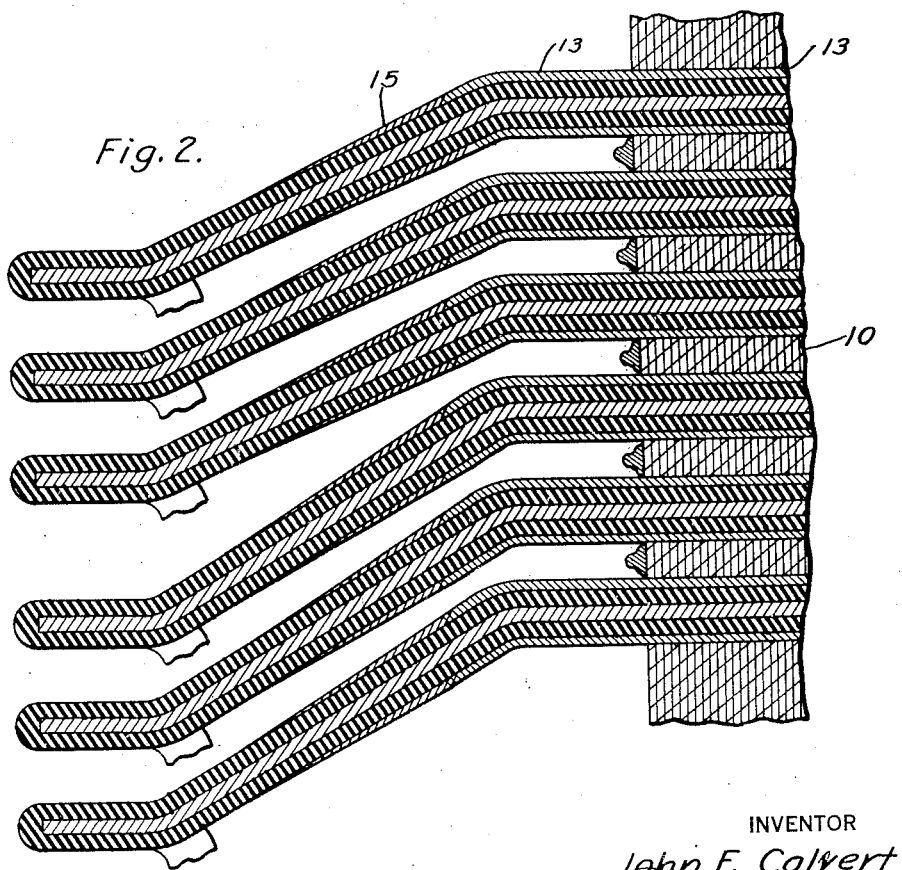

May 26, 1936.      J. F. CALVERT      2,042,208
DYNAMO-ELECTRIC MACHINE
Filed April 12, 1934      2 Sheets-Sheet 2
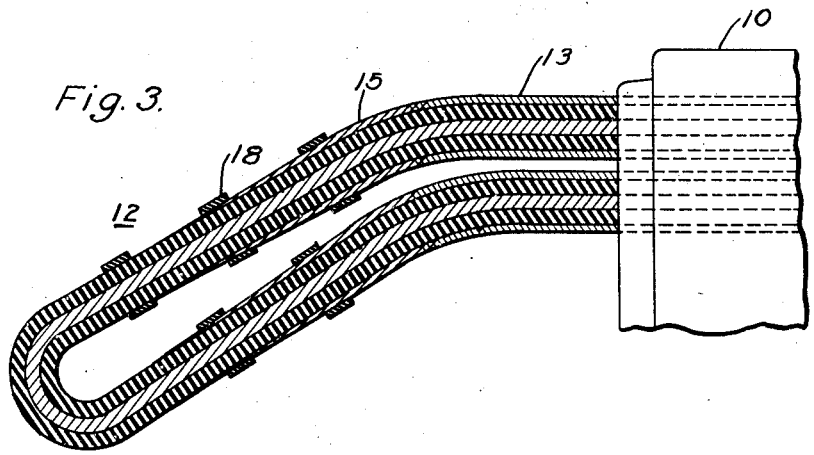
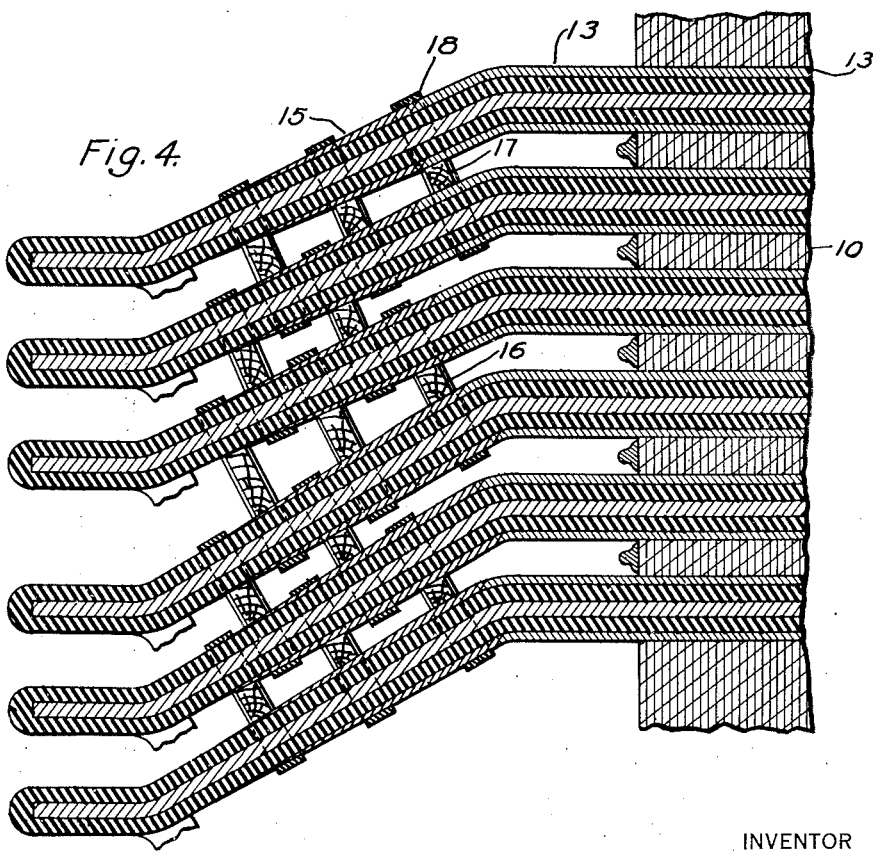
INVENTOR
John F. Calvert
BY
ATTORNEY Patented May 26, 1936

2,042,208

UNITED STATES PATENT OFFICE 2,042,208

DYNAMO-ELECTRIC MACHINE

John F. Calvert, Irwin, Pa., assignor to Westinghouse Electric & Manufacturing Company, East Pittsburgh, Pa., a corporation of Pennsylvania Application April 12, 1934, Serial No. 720,224

10 Claims. (Cl. 171—206)

The invention relates generally to dynamo-electric machines and more particularly to methods of protecting the windings against electrostatic discharges.

The object of the invention generally stated is to provide for protecting the end turn portions of the windings of a high-voltage dynamo-electric machine from the harmful effects of electrostatic discharges between turns.

Another object of the invention is to provide for dissipating the electrostatic charges accumulated on the surfaces of the end turn portions of the windings of a dynamo-electric machine in order to facilitate the design of the machine to operate at a high voltage.

The invention accordingly is disclosed in the embodiment thereof shown in the accompanying drawings and comprises the features of construction, combination of elements and arrangement of parts which will be exemplified in the construction hereinafter set forth and the scope of the application of which will be indicated in the claims.

For a fuller understanding of the nature and objects of the invention, reference should be had to the following detail description taken in conjunction with the accompanying drawings, in which Figure 1 is a view in section of the end turn portion of an armature winding showing conducting and semi-conducting materials applied in accordance with this invention, Fig. 2 is a view in section showing conducting and semi-conducting materials applied to the surfaces of a plurality of phase windings in accordance with this invention, Fig. 3 is a view in section of the end turn portion of an armature winding showing a modification of the invention, and Fig. 4 is a view in section of the end turn portions of an armature winding showing how the windings are spaced and the means for electrically connecting the conducting and semi-conducting materials applied to the surfaces of the windings.

Referring now to the drawings, 10 designates the armature iron of a dynamo-electric machine. This armature iron is usually built up from a plurality of thin sheets.

The windings of the dynamo-electric machine comprise insulated conductors 12 arranged in a predetermined manner depending on the results it is desired to obtain. The quality and thickness of the insulating material of the conductor 12 will depend on the conditions to be met. Insulating materials suitable for nearly all purposes are well known to the trade.

In building high-voltage dynamo-electric machines some suitable conducting material is applied to the portions of the windings that seat in the armature slots. The purpose of this is to electrically connect the surfaces of the windings to the armature iron to prevent the building up of different potentials on the surfaces of the windings inside the armature iron, and differences of potential between the coil surface and the iron which will result in electrostatic discharges.

In the present invention, a conducting material 13 is shown applied to the windings 12. It has been found that a material known to the trade as aquadag gives very satisfactory results. Aquadag is essentially a mixture of graphite and water paint.

In the winding of the dynamo-electric machine the conductors 12 are looped at the ends, as illustrated in the drawings, forming end turn portions. In this structure, the end turn portions comprise the portions of the windings extending axially of the armature and beyond the iron, the legs extending at an angle to the axial portions, sometimes called the "oblique diamond" portions, and the loop portions, which lie in radial planes, connecting the two oblique portions. In the operation of the machine there is a tendency to build up, on the surfaces of the end turn portions, electrostatic charges which may vary in potential between different points on the same end turn portion and between turns of the same phase winding and turns of different phase windings.

In order to distribute this potential to prevent electrostatic discharges along the end turn portions and between different end turn portions, aquadag, as shown at 13, is applied to the surfaces of the windings for a predetermined distance beyond the armature iron. In the present embodiment of the invention, the aquadag is shown as extending beyond the bend in the end turn portions. However, the distance the aquadag will be extended from the armature iron will vary with different designs of dynamo-electric machines and will be predetermined in the building of the machine to get desired operating conditions.

It is well known that aquadag offers a high resistance to the flow of electricity. However, in this particular instance it is utilized for distributing potential and to cooperate in the dissipation of electrostatic discharges and it is, therefore, used as a conductor.

Beyond the bend in the end turn portions good results have been obtained by applying a material having a higher ohmic resistance than aquadag. In the present embodiment, a semi-conducting material 15 similar to that disclosed in copending application, Serial No. 704,367 filed in the name of L. McCulloch has been utilized with considerable success.

In order to obtain what is commonly described as a feathering-out of the potential along the surfaces of the different windings, the semi-conducting material 15 is utilized and, as illustrated, it gradually decreases in thickness from the aquadag outwardly. Many methods may be adopted for applying the semi-conducting material 15 in a manner to give this feathering-out of the potential. It has been found that this semi-conducting material may be varied considerably in resistance by the treatment given the ingredients in the process of preparing it. Therefore, in order to get substantially the result that would be obtained by gradually decreasing the thickness of the semi-conducting material as it extends outwardly, different mixtures of the semi-conducting material are applied in short sections.

In operation, the surfaces of the end turn portions covered by the aquadag are maintained at substantially the potential of the armature iron. The sections of the semi-conducting material are so predetermined that a voltage gradient is maintained therealong which will not result in electrostatic discharges along the conductors.

In determining the extent of the aquadag on the surfaces of the end turn portions and the point at which to start applying the semi-conducting material, consideration is given to the spacing of the windings of each phase and of the different phases.

It has been found that the difference in the electrostatic potential generated on the surfaces of the end turn portions of different phases is greater than that generated on the surfaces of the end turn portions of the same phase. In order to compensate for this condition, the spacers 16 disposed between the end turn portions of the different phase windings are made wider than the spacers 17 disposed between the end turn portions of the same phase. This use of spacers of different sizes may be taken advantage of to cooperate in the preventing of electrostatic discharges between the end turn portions.

In some cases in addition to utilizing spacers of different thicknesses or sizes, conductors 18 may be disposed between the conducting and semi-conducting materials applied to the end turn portions to electrically connect them. A suitable conductor for connecting the conducting and semi-conducting materials 13 and 15 respectively has been produced by painting aquadag on asbestos tape. This gives a conductor having the proper resistance and one which will stand all the operating conditions found in dynamo-electric machines.

The use of the conductors between the conducting and semi-conducting materials applied to the end turn portions has been found satisfactory in commercial use.

Since certain changes may be made in the above construction and different embodiments of the invention may be made without departing from the spirit and scope thereof, it is intended that all matter contained in the above description or shown in the accompanying drawings shall be interpreted as illustrative and not in a limiting sense.

I claim as my invention:

1. In a dynamo-electric machine, in combination, armature iron, a plurality of insulated phase windings carried by the armature iron, the phase windings extending beyond the armature iron presenting spaced end turn portions and conductors extending between the different end turn portions, said conductors being disposed on the end turn portions between the armature iron and the loops to electrically connect the surfaces of said end turn portions to prevent differences in electrical potential and corona discharge.

2. In a dynamo-electric machine, in combination, armature iron, a plurality of insulated phase windings carried by the armature iron, the phase windings extending beyond the armature iron presenting spaced end turn portions, a conducting material applied to the surface of the insulated windings and conductors extending between the different phase windings near the armature iron electrically connecting the conducting material applied to the windings.

3. In a dynamo-electric machine, in combination, armature iron, a plurality of insulated phase windings carried by the armature iron, the phase windings extending beyond the armature iron presenting spaced end turn portions, spacing members disposed between the end turn portions, the spacing members between the different phase windings being wider than the spacing members between the end turn portions of the same phase windings and conductors extending between the surfaces of the different phase windings near the armature iron.

4. In a dynamo-electric machine, in combination, armature iron, a plurality of insulated phase windings carried by the armature iron, the phase windings extending beyond the armature iron presenting end turn portions, a conducting material applied to the surfaces of the insulated windings, spacing members disposed between the end turn portions, the spacing members between the end turn portions of the different phase windings being wider than the spacing members between the end turn portions of the same phase windings, and conductors extending between the end turn portions of the different phase windings near the armature iron electrically connecting the conducting material applied to the insulated windings.

5. In a dynamo-electric machine, in combination, armature iron, a plurality of insulated phase windings carried by the armature iron, the phase windings extending beyond the armature iron presenting end turn portions, a conducting material applied to the surface of the insulated windings and tape carrying a conducting material extending between the end turn portions near the armature iron electrically connecting the conducting material applied to the surface of the phase windings.

6. In a dynamo-electric machine, in combination, armature iron, a plurality of insulated phase windings carried by the armature iron, the phase windings extending beyond the armature iron presenting end turn portions, a conducting material applied to the surface of the insulated windings, a flexible binder extending between the windings of the different phase windings and a conducting material applied to the binder electrically connecting the conducting material applied to the different phase windings near the armature iron.

7. In a dynamo-electric machine, in combination, armature iron, a plurality of insulated phase windings carried by the armature iron, the phase windings extending beyond the armature iron presenting end turn portions, a conducting material applied to the surface of the insulated windings, spacing members disposed between the end turn portions, the spacing members disposed between the end turn portions of the different phase windings being wider than the spacing members disposed between the end turn portions of the same phase windings and means electrically connecting the conducting material applied to the windings near the armature iron.

8. In a dynamo-electric machine in combination, armature iron, a plurality of insulated windings carried by the armature iron, the windings extending beyond the armature presenting spaced end turn portions and means for electrically connecting the surfaces of the end turn portions, extending between the windings.

9. In a dynamo-electric machine in combination, armature iron, a plurality of insulated armature windings carried by the armature iron, the armature windings extending beyond the armature iron presenting end turn portions, a conducting material applied to the surfaces of the windings near the armature iron, a semi-conducting material applied to the surfaces of the end turn portions of the windings, the semi-conducting material extending along the end turn portions outwardly from the conducting material and being arranged to taper the resistivity to the flow of electrical current longitudinally of the end turn portions and conducting material extending between the end turn portions electrically connecting the materials applied to the surfaces of the different end turn portions.

10. In a dynamo-electric machine in combination, armature iron, a plurality of insulated windings carried by the armature iron, the phase windings extending beyond the armature iron presenting end turn portions, spacing members disposed between the phase windings, the spacing members between the different phase windings being wider than the spacing members between the same phase windings, a conducting material applied to the surfaces of the windings near the armature iron, a semi-conducting material applied to the surfaces of the windings and extending outwardly from the conducting material, the semi-conducting material being arranged to gradually increase in resistance as it progresses outwardly and means for electrically connecting the materials applied to the surfaces of the different end turn portions of the windings.

JOHN F. CALVERT.